United States Patent
Haldemann

(10) Patent No.: US 6,703,752 B2
(45) Date of Patent: Mar. 9, 2004

(54) STATOR WINDING BAR FOR AN ELECTRICAL MACHINE

(75) Inventor: Johann Haldemann, Birr (CH)

(73) Assignee: Alstom Technology Ltd, Baden (CH)

(*) Notice: Subject to any disclaimer, the term of this patent is extended or adjusted under 35 U.S.C. 154(b) by 0 days.

(21) Appl. No.: 09/993,676

(22) Filed: Nov. 27, 2001

(65) Prior Publication Data

US 2002/0063489 A1 May 30, 2002

(30) Foreign Application Priority Data

Nov. 27, 2000 (DE) .......................... 100 58 856

(51) Int. Cl.[7] .............................. H02K 15/08
(52) U.S. Cl. .................. 310/213; 310/215; 310/214; 310/195; 310/179
(58) Field of Search ........................ 310/213

(56) References Cited

U.S. PATENT DOCUMENTS

| | | | | |
|---|---|---|---|---|
| 1,144,252 A | * | 6/1915 | Roebel | |
| 2,821,641 A | * | 1/1958 | Ringland | |
| 3,118,015 A | * | 1/1964 | Willyoung | 174/33 |
| 4,128,779 A | * | 12/1978 | Salon | 310/213 |
| 4,384,227 A | * | 5/1983 | Kawai | 310/213 |
| 4,633,115 A | * | 12/1986 | Saitoh et al. | 310/213 |
| 4,959,575 A | * | 9/1990 | Saitoh et al. | 310/213 |
| 5,323,079 A | * | 6/1994 | Nieves et al. | 310/213 |
| 5,777,417 A | * | 7/1998 | Haldemann | 310/201 |
| 5,965,965 A | * | 10/1999 | Umeda et al. | 310/52 |

FOREIGN PATENT DOCUMENTS

CH 778648 A1 * 6/1997 ............. H02K/3/14

* cited by examiner

Primary Examiner—Thomas M. Dougherty
Assistant Examiner—Heba Y. Elkassabgi
(74) Attorney, Agent, or Firm—Burns, Doane, Swecker & Mathis, L.L.P.

(57) ABSTRACT

In a stator winding bar for an electrical machine without end winding transposition and with transposition in the active part of 450°, the middle part of the active part, in order to compensate the external fields acting in the region of the end windings and inducing circulating currents, has a length that is greater than ¾ of the total length of the active part.

2 Claims, 3 Drawing Sheets

STATOR WINDING BAR FOR AN ELECTRICAL MACHINE

FIELD OF INVENTION

The present invention relates to the field of electrical machines, and more particularly a stator winding bar.

BACKGROUND OF THE INVENTION

Alternating current machines use Roebel bars for the armature winding. Roebel bars consist of insulated strands that are arranged on top and next to each other and transposed. The transposition patented by L. Roebel in 1912 provides a full turn in the active part (360° transposition). In the end zones (end winding), the bar is not transposed. This type of transposition compensates the field along the active part. However, it does not compensate the field components of the end winding.

Since then, many additional possibilities of transposition in the active part and end zones have been described and used. U.S. Pat. No. 3,118,015 to Willyoung describes an entire group of transpositions. This makes it possible to infinitely vary the transposition angle in the active part between 360° and 720° while preserving the full compensation of the slot field. The transposition of the active part is composed as follows: A middle part arranged symmetrically to the machine center, in which the crimping distances correspond to the 360° standard transposition is provided with two border zones that have crimping distances with half the length of those of the middle part.

A well-known type of transposition constructed in this way is the 540° transposition as described in U.S. Pat. No. 2,821,641 to Ringland. The middle part extends over half of the active length and therefore has a transposition angle of 180°; the border zones extend over a quarter of the active part length each and as a result of half of the crimping distances therefore also have a 180° transposition. This adds up to a total transposition of 540°. This type of transposition compensates the field along the active part and compensates the external field of the end winding. The end winding inherent field in contrast is not compensated. Inherent field here means a field that changes in sinus shape over time and is positioned transversely to the bar side, and whose amplitude extends proportionally over the bar height in relation to the bar center (bar center: field remains zero, top bar edge: maximum field, bottom bar edge: same maximum field, reversed plus or minus sign). The external field accordingly is a field that changes in sinus shape over time that is positioned transversely to the bar side and remains in phase in relation to the bar height (constant field over bar height at a point in time).

Another transposition within the scope of the teaching of Willyoung's patent is the 450° transposition. The middle part hereby extends over ¾ of the active partial length (270° transposition), the border zones each extend over ⅛ of the active partial length and each have a 90° transposition. This type of transposition compensates the field along the active part and compensates the end winding inherent field relatively well. The external field of the end winding in contrast is only partially compensated.

In principle, it can be said that all possible transpositions according to Willyoung never compensate all effects of the end windings; a remainder of the inherent or external field always remains uncompensated.

SUMMARY OF THE INVENTION

It is the objective of the invention to create a stator winding bar in which, for the 450° transposition in the active part, the external field of the end winding is largely compensated, and the circulating currents therefore are practically reduced to very small values.

An important aspect of the invention includes increasing the proportion of the middle part with respect to the length of the active part while preserving the same overall transposition and dividing the overall transposition over the middle part and border zones of the active part. As a result, additional induction surfaces for the external field are provided within the conductor loops of the stator winding bar in the middle part, which induction surfaces compensate the induction surfaces in the end windings without substantially changing the other compensations.

In particular, the middle part is extended in length to such an extent ¾ over the total length of the active part that the resulting additional induction surface for external fields approximately equals the effect of the corresponding induction surface in the end windings (same flux linking).

BRIEF DESCRIPTION OF THE DRAWINGS

Preferred embodiments of the invention are disclosed in the following description and illustrated in the accompanying drawings, in which.

DETAILED DESCRIPTION OF THE PREFERRED EMBODIMENTS

Figure 3:
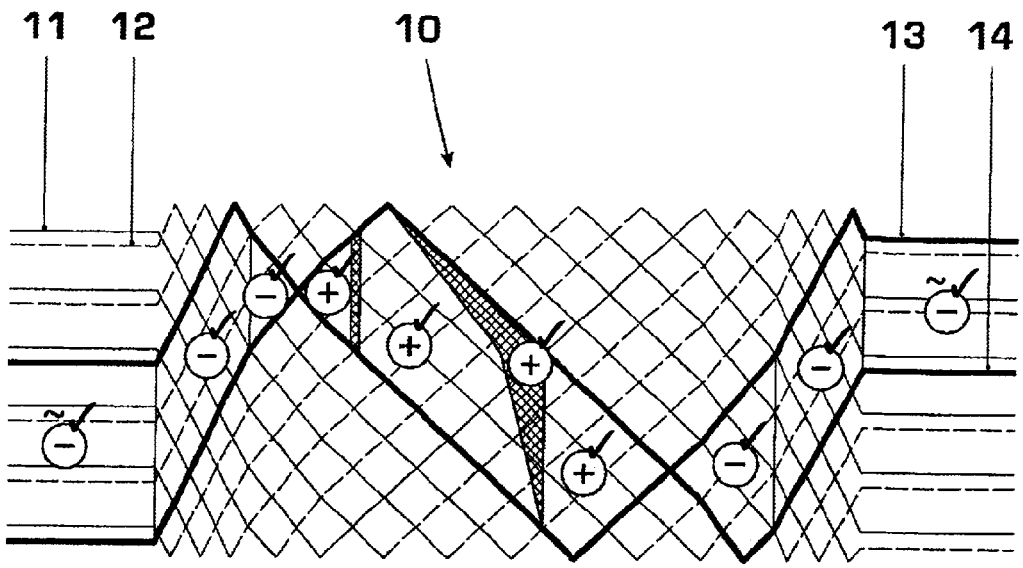
FIG. 3 shows an illustration of an exemplary embodiment of a stator bar according to the invention, with extended middle part and resulting compensation of the external field portions in the end winding.
Figure 4:
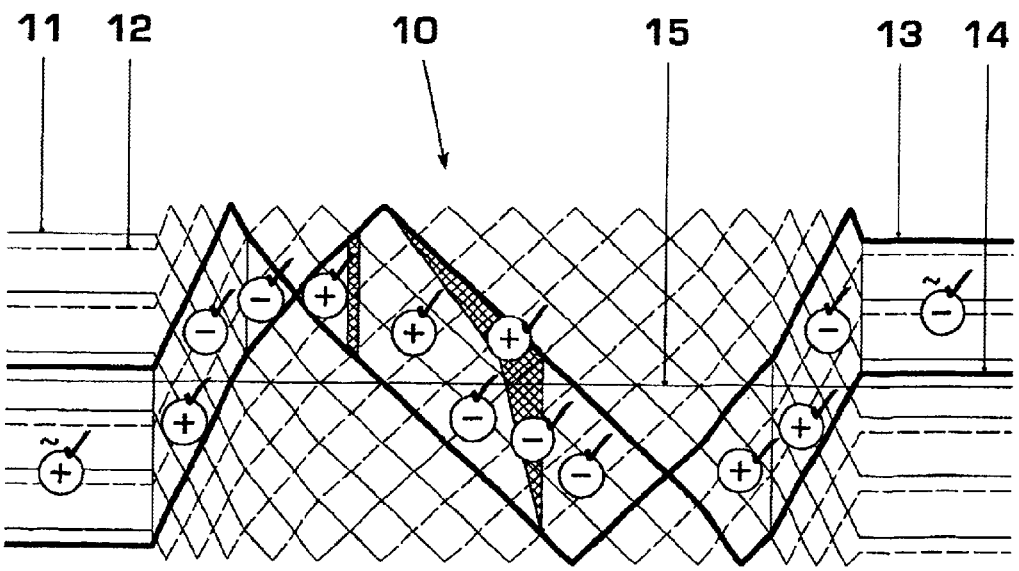
FIG. 4 shows the situation of the stator bar in FIG. 3 in relation to the inherent field; and, FIG. 5 shows a comparison of the amplitudes of the strand currents in relation to the nominal value for the example of a stator winding bar with standard 450° transposition (graph a) and transposition according to the invention (graph b).

FIGS. 1 to 4 each show a side view of a stator winding bar 10 (Roebel bar) with a total of 2×6=12 strands 11, . . . , 14. The stator winding bar 10 is positioned with an active part AT in the winding slot of the stator laminated core. Within the active part, the strands 11, . . . , 14 undergo a transposition of 450°. End winding WK, in which the strands 11, . . . , 14 are not transposed, border the active part AT on both sides, The active part AT is divided into a middle part MT and two border zones RZ of equal length that enclose the center part MT. In the center part, the transposition is 270°, in the border zones RZ 90° each FIGS. 1 and 2 hereby relate to a standard 450° transposition (length of the middle part MT is ¾ of length of active part; K=¼ according to U.S. Pat. No. 3,118,015). This transposition can be described as (0/450/0), since it has a (compensating) transposition of 450° in the active part AT, while the transposition at both end windings WK is 0. In comparison with this, FIGS. 3 and 4 show a 450° transposition according to the invention (with extended middle part MT).

Reference number 11 stands for the 6 strands of the rear (in viewing direction); reference number 12 stand for the front stack. When the strands are located in the front during the transposition, they are drawn with continuous lines; when they are in the back, they are drawn with broken lines. A representative loop with strands 13 and 14 is in each case drawn with a thick line and is used to evaluate the transposition, whereby the plus or minus signs essential for the compensation are in each case entered. Two evaluations are made: first the external field analysis in FIG. 1 or FIG. 3 (surfaces within the loops must be added with the respective, correct plus or minus signs), and then the inherent field analysis in FIG. 2 or FIG. 4 (surfaces within the loops in relation to the center line 15 of the winding bar must be added with the respective, correct plus or minus signs). If the sum of all partial surfaces is zero, no circulating currents occur.

Figure 1:
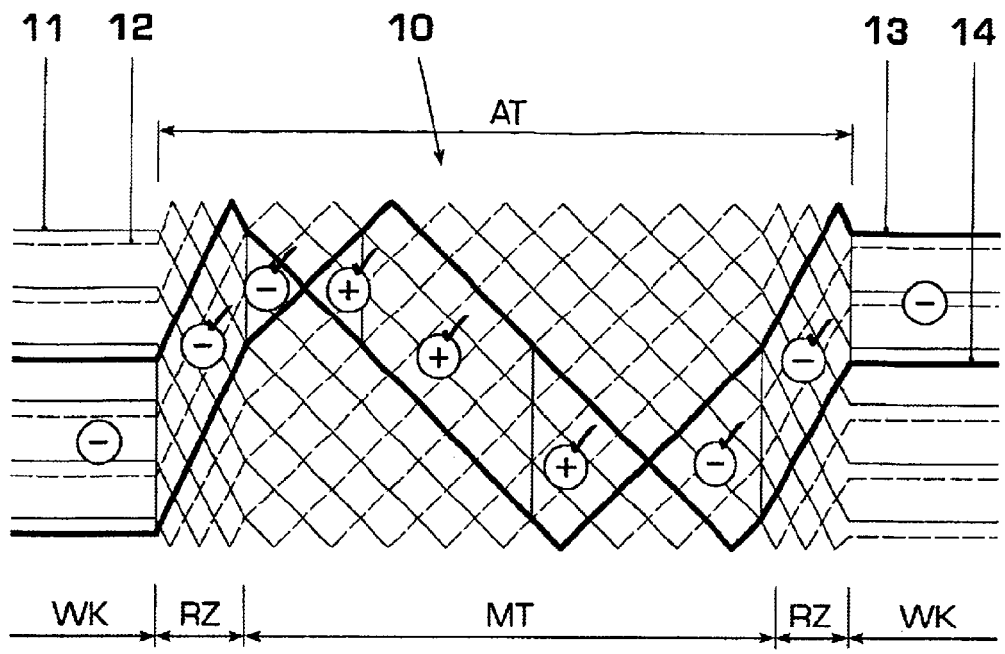
FIG. 1 shows a standard schematic illustration of the actually known 450° transposition according to Willyoung of a stator winding bar with 2×6 strands and the surfaces of two selected strands, which are effective for the external field, with the plus or minus signs that are important for the summation of the loop currents (the surfaces or respectively external field portions in the end windings are not compensated)
Figure 2:
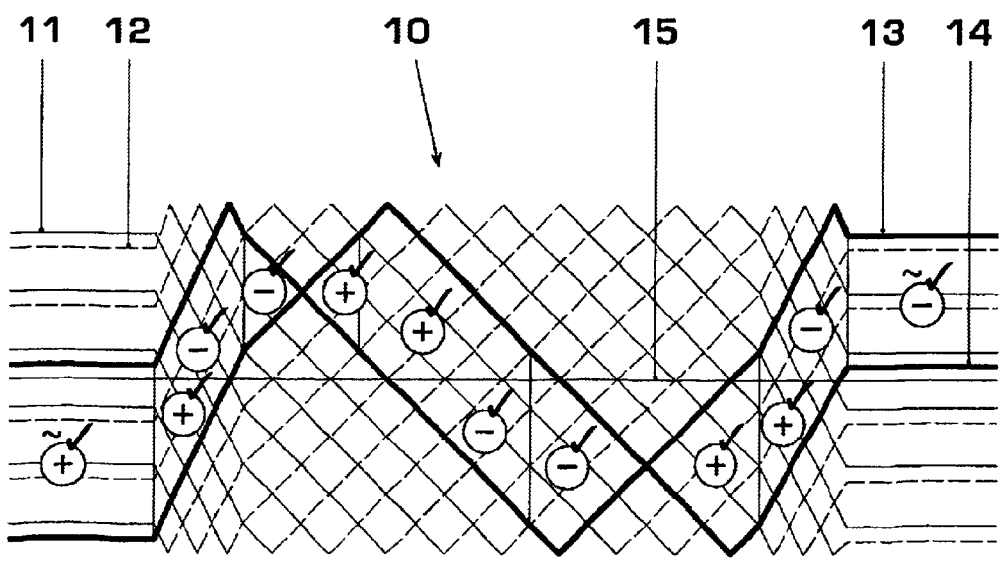
FIG. 2 shows the situation of the stator bar in FIG. 1 in relation to the inherent field.

As can be clearly seen from FIG. 1, the external field portions in the end windings WK, which penetrate the loop (drawn with thick line) of strands 13 and 14, are not compensated during the standard transposition. In contrast, the external field portions in the active part AT are all compensated.

According to the invention, the formula of Willyoung regarding the length of the middle part MT for the 450° transposition is now changed to the effect that this section is extended beyond ¾ of the length of the active part AT (the middle part MT still has a 270° transposition). In this way, the strands that carry most of the current, are kept near the slot bottom for a longer distance, and those that carry the least current are kept for a longer distance in the active part AT towards the slot opening. It is known that these conditions have a compensating effect on the current distribution in the Roebel bar. This transposition can be described as (0/450unv/0) (unv=incompletely compensated in active part, in order to compensate the residual field of the end winding).

According to FIG. 3, in such a stator winding bar with 450° transposition in the extended active part AT, the external field portions in the end windings WK that penetrate the loop (shown bold) of the strands 13 and 14, are compensated by the cross-wise striated (additional) portions 20 in the active part AT. The extension of the middle part MT is hereby preferably chosen so that a maximum compensation is achieved. The residual external field portions in the active part AT are all compensated.

Figure 5:
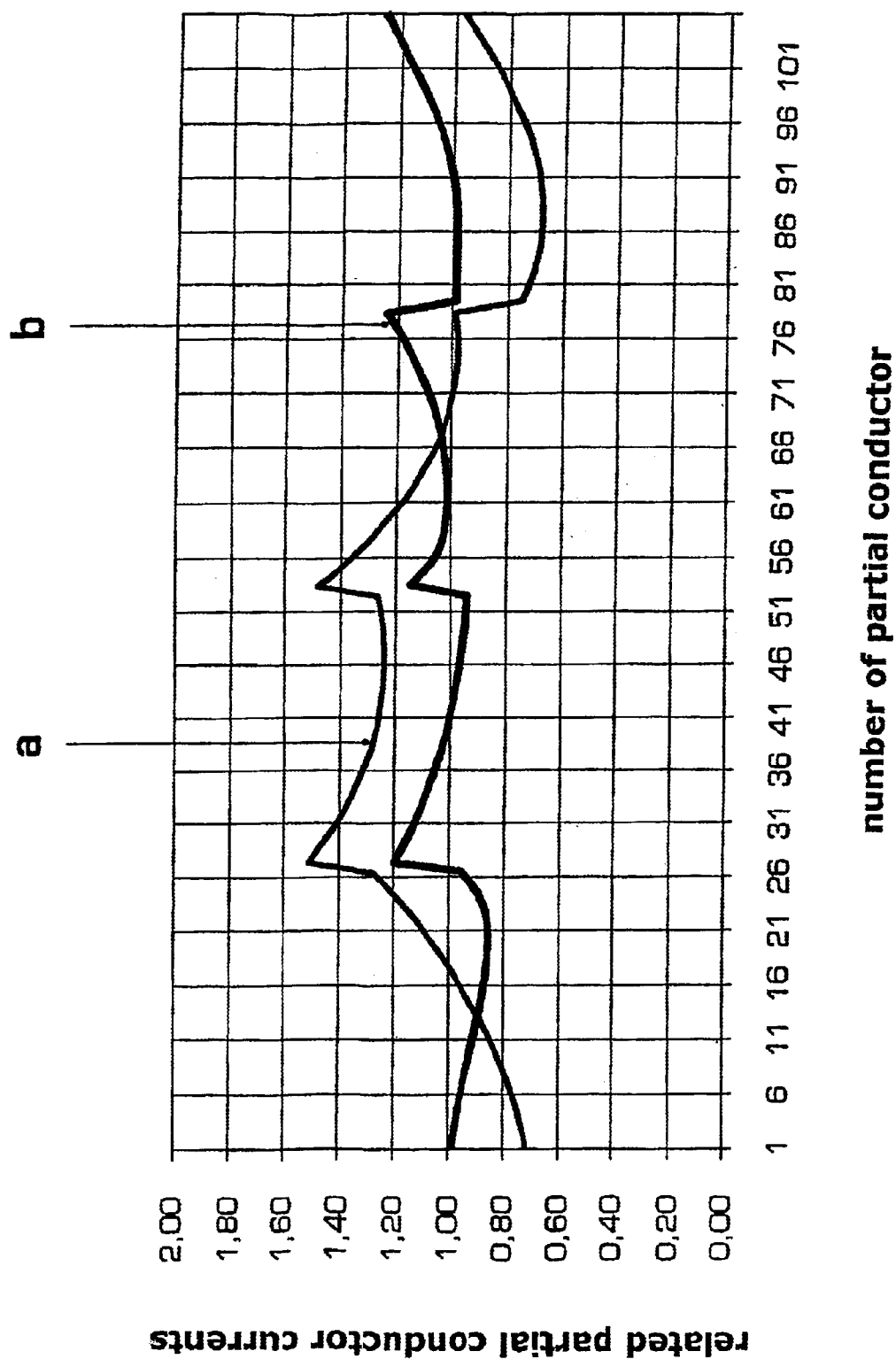

If such a (0/450unv/0) transposition is performed for a two-pole turbo generator with a two-layer winding (consisting of bars with, for example, two stacks of strands; a total of 100 strands), significant improvements are achieved in comparison to the standard transposition according to Willyoung. FIG. 5 shows the amplitudes of the strand currents (related to the nominal value), at nominal load, on top of the number of the respective strand. Graph (a) hereby relates to the standard (0/450/0) transposition, graph (b) to the novel (0/450unv/0) transposition. It can be clearly seen that this invention is able to almost completely eliminate the circulating currents (max. strand currents are max. 20% above reference value). This provides a construction of a Roebel bar without end winding transposition that makes it possible to effectively suppress the circulating currents.

The principles, preferred embodiments and manner of use of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A stator winding bar for an electrical machine, comprising:

a plurality of strands arranged in stacks on top and next to each other;

an active part extending along a winding slot of the stator laminated core, said active part being adjoined on each of both sides by an end winding, whereby said active part is divided in length into a central middle part and two border zones of equal length enclosing the central middle part, and whereby the strands of the stator winding bar are transposed in the active part according to the manner of a Roebel bar with each other by approximately 450°, of which 270° are on the middle part and 90° each are on the two border zones, while the strands in the end windings extend without transposition parallel to each other, characterized in that, for the compensation of the external fields that act in the region of the end winding and induce circulating currents, the middle part of the active part has a length that is greater than ¾ of the total length of the active part.

2. The stator winding bar as claimed in claim 1, wherein the length of the middle part is extended to such an extent beyond ¾ of the total length of the active part that the resulting additional induction surface for external fields is approximately equal to the corresponding induction surface in the end winding.

* * * * *